(12) United States Patent
Muir

(10) Patent No.: US 9,026,802 B2
(45) Date of Patent: May 5, 2015

(54) GAMING SECURITY SYSTEM

(75) Inventor: Robert Linley Muir, Rosebery (AU)

(73) Assignee: Aristocrat Technologies Australia Pty Limted (AU)

( * ) Notice: Subject to any disclaimer, the term of this patent is extended or adjusted under 35 U.S.C. 154(b) by 0 days.

(21) Appl. No.: 13/540,317

(22) Filed: Jul. 2, 2012

(65) Prior Publication Data

US 2012/0272071 A1 Oct. 25, 2012

Related U.S. Application Data

(63) Continuation of application No. 10/089,759, filed as application No. PCT/AU99/01192 on Sep. 29, 2000, now Pat. No. 8,250,372.

(30) Foreign Application Priority Data

Sep. 30, 1999 (AU) .................................. PQ3216

(51) Int. Cl.
*G06F 12/14* (2006.01)
*G06F 9/44* (2006.01)
*G06F 21/57* (2013.01)

(52) U.S. Cl.
CPC ......... *G06F 9/4401* (2013.01); *A63F 2300/201* (2013.01); *G06F 21/575* (2013.01); *G06F 2211/1097* (2013.01); *G06F 2221/2109* (2013.01)

(58) Field of Classification Search
None
See application file for complete search history.

(56) References Cited

U.S. PATENT DOCUMENTS

| | | | |
|---|---|---|---|
| 5,325,365 A | 6/1994 | Moore et al. |
| 5,379,342 A | 1/1995 | Arnold et al. |
| 5,421,006 A | 5/1995 | Jablon et al. |
| 5,643,086 A | 7/1997 | Alcorn et al. |
| 5,657,475 A | 8/1997 | Gillespie et al. |
| 5,826,012 A | 10/1998 | Lettvin |
| 6,185,678 B1 | 2/2001 | Arbaugh et al. |
| 6,230,291 B1 | 5/2001 | Tokieda |
| 6,263,431 B1 | 7/2001 | Lovelace et al. |
| 6,324,644 B1 | 11/2001 | Rakavy et al. |
| 6,401,208 B2 | 6/2002 | Davis et al. |
| 6,587,947 B1 | 7/2003 | O'Donnell et al. |
| 6,715,067 B1 | 3/2004 | Rhoads et al. |
| 7,356,682 B2 | 4/2008 | Lampson et al. |

OTHER PUBLICATIONS

Arbaugh et al., "A Secure and Reliable Bootstrap Architecture", IEEE, 1997, Retrieved from the Internet on Aug. 19, 2007: , URL: http://ieeexplore.ieee.org/iel3/4693/13107/00601317.pdf?tp= &arnumber=601317&isnumber=13107>.
Newton, "Newton's Telecom Dictionary", 1998, p. 62.

*Primary Examiner* — Minh Dinh
(74) *Attorney, Agent, or Firm* — McAndrews, Held & Malloy, Ltd.

(57) ABSTRACT

Verification of software to be run in a secure environment is performed by comparing a critical portion of the executable boot program code in an EPROM with code stored in a logic circuit. The comparison may be performed before the code to be verified is run or while it is running in the event that the validation fails certain critical functions of the platform are inhibited to prevent fraudulent operation of the platform. The system is particularly applicable to gaming machines to avoid cheating.

104 Claims, 2 Drawing Sheets

GAMING SECURITY SYSTEM

RELATED APPLICATION

This application is a continuation of U.S. patent application Ser. No. 10/089,759, filed on Dec. 30, 2002 now U.S. Pat. No. 8,250,372, which is a National Stage Application of the International Application PCT/AU1999/01192 having a filing date of Sep. 29, 2000, which claims priority to Australian Patent Application PQ3216 filed Sep. 30, 1999, the contents of which are incorporated herein by reference in their entirety.

FIELD OF INVENTION

The present invention relates generally to gaming machines and in particular, the invention provides an improved method of detecting tampering in software such that the need for other expensive security measures may be reduced.

BACKGROUND OF THE INVENTION

Methods have been put forward for the authentication of gaming software using cryptographic digital signatures. Such methods check that each software module to be loaded has been signed by the authorized signer before. It will not load a module without a valid signature. The security of the machine can be traced back to the boot software which resides in EPROM or flash memory. The boot software will load no unauthorized code, which in turn will load no unauthorized code, as this is a requirement for code to authorized in the first place. However, these methods have the disadvantage that the machine can be tampered with by modifying the boot code to remove the signature checks.

In gaming the term multigame refers to a game machine in which more than one game is selectable without changing the hardware or software, usually by the player, but also by the operator. In a multigame machine the software is preferably separated into separate physical parts (eg. EPROM) or files. A system program provides supporting functions and the operating system while the game program provides that code which is different between games. A Multigame machine is then typically comprised of System program and multiple independent game programs. This flexibility introduces the possibility of unauthorized copying and use of games. It is relatively easy for an operator to copy game EPROMS and use them in machines for which they are not authorized.

In non-gaming applications non-volatile re-writable memory, typically Flash, is becoming very widely used for its high capacity and ease of field upgrades. In the past, upgrading the boot program of a gaming machine has not been feasible for security reasons. Regulators have been concerned that illegal code could be downloaded to the gaming machine. Regulators also generally require that code inside a gaming machine be verifiable, however if the boot code were changed it would only be possible to verify the data by removing the chip and reading it in a special purpose chip reader. The program cannot be self verifying as tampered code could fake the correct response. This is very inconvenient in system design and customer use.

SUMMARY OF THE INVENTION

According to a first aspect, the present invention consists in a boot program security system associated with a platform for software execution, wherein the security system verifies an executable boot program to be executed on the platform and which contains basic components of a platform operating system which perform a security validation of other software components and authorizes their execution on the platform, the platform including processor means for executing the executable boot program, boot program memory means in which the executable boot program is stored, and address bus means and data bus means which provide communication between the processor means and the boot program memory means, the security system including boot checking memory means, comparison means, and software monitoring means to monitor addresses expressed on the address bus means by the processor means, the software monitoring means being responsive to addresses on the address bus corresponding to locations in which a secure portion of the executable boot program is stored, to read data expressed on the data bus means by the boot program memory means and representing words of the executable boot program being verified, providing the data read from the data bus to the comparison means for comparison with corresponding data in the boot checking code memory means and if the data does not match, producing a signal to indicate an abnormal condition.

According to a second aspect, the present invention consists in a boot program security system associated with a platform for software execution, wherein the security system overrides code fetches when a secure portion of a boot program is being executed on the platform, the boot program containing basic components of a platform operating system which perform a security validation of other software components and authorizes their execution on the platform, the platform including processor means for executing the programs, memory means in which the executable programs are stored and address bus means and data bus means which provide communication between the processor means and the memory means, the security system including secure boot program memory means, and software monitoring means to monitor addresses expressed on the address bus means by the processor means, the software monitoring means being responsive to addresses on the address bus corresponding to address locations allocated to the secure portion of boot program to read the corresponding locations of the secure boot program memory means and to pass the data read from the secure boot program memory means to the processor means for execution.

According to a third aspect, the present invention consists in a boot program security system associated with a platform for software execution, wherein the security system verifies an executable boot program to be executed on the platform and which contains basic components of a platform operating system which perform a security validation of other software components and authorizes their execution on the platform, the platform including processor means for executing the executable boot program, boot program memory means in which the executable boot program is stored, and address bus means and data bus means which provide communication between the processor means and the boot program memory means, the security system including boot checking memory means, comparison means, and software reading means to read data from the boot program memory means corresponding to a secure portion of the executable boot program and providing the data read from the boot program memory means to the comparison means for comparison with corresponding data in the boot checking code memory means and, if the data does not match, producing a signal to indicate an abnormal condition.

According to a fourth aspect, the present invention consists in a security override device for overriding a secure program stored in a secure program memory and verified prior to or during execution, including override program storage means holding a program which will be executed in place of the secure program during selected periods, verification detection means to detect completion of a verification process performed on the secure program and multiplexing means to multiplex the override program storage means with the secure program means, whereby the override program storage means is mapped in and out of memory space to selectively execute the override program.

According to a fifth aspect, the present invention consists in a method of verifying an executable boot program associated with a platform for software execution, the boot program being for execution on the platform and containing basic components of a platform operating system which perform a security validation of other software components and authorizes their execution on the platform, the platform including processor means for executing the executable boot program, boot program memory means in which the executable boot program is stored, and address bus means and data bus means which provide communication between the processor means and the boot program memory means, a verification system including boot checking memory means, comparison means, and software monitoring means and the method including the steps of, the software monitoring means monitoring addresses expressed on the address bus means by the processor means, the software monitoring means being responsive to addresses on the address bus corresponding to locations in which a secure portion of the executable boot program is stored, to read data expressed on the data bus means by the boot program memory means and representing words of the executable boot program being verified, and providing the data read from the data bus to the comparison means, the comparison means comparing the data read from the data bus with corresponding data in the boot checking code memory means, and if the data does not match, the comparison means producing a signal to indicate an abnormal condition.

According to a sixth aspect, the present invention consists in a method of running a boot program on a platform for software execution in a secure manner by overriding code fetches when a secured portion of the boot program is being executed on the platform, the boot program containing basic components of a platform operating system which perform a security validation of other software components and authorizes their execution on the platform, the platform including processor means for executing the programs, memory means in which the executable programs are stored and address bus means and data bus means which provide communication between the processor means and the memory means, and a security system including secure boot program memory means, and software monitoring means to monitor addresses expressed on the address bus means by the processor means, the method comprising the steps of, monitoring addresses on the address bus and detecting addresses corresponding to address locations allocated to the secure portion of boot program, reading the corresponding locations of the secure boot program memory means, and passing the data read from the secure boot program memory means to the processor means for execution.

According to a seventh aspect, the present invention consists in a method of verifying an executable boot program associated with a platform for software execution, the boot program being for execution on the platform and containing basic components of a platform operating system which perform a security validation of other software components and authorizes their execution on the platform, the platform including processor means for executing the executable boot program, boot program memory means in which the executable boot program is stored, and address bus means and data bus means which provide communication between the processor means and the boot program memory means, and a security system including boot checking memory means, comparison means, and software reading means, the method comprising the steps of, reading data from the boot program memory means corresponding to a secure portion of the executable boot program, providing the data read from the boot program memory means to the comparison means, comparing the data read from the boot program memory means with corresponding data in the boot checking code memory means, and if the data does not match, producing a signal to indicate an abnormal condition.

According to a eighth aspect, the present invention consists in a method of overriding a secure program stored in a secure program memory and verified prior to or during execution, including the steps of storing an override program in an override program storage means, the override program being a program which will be executed in place of the secure program during selected periods, detecting completion of a verification process performed on the secure program and multiplexing the override program storage means with the secure program means, whereby while the verification of the secure program is not in progress the override program storage means is mapped in and out of the memory space to selectively execute the override program.

Preferably a logic circuit is provided in which the boot checking code memory means, the comparison means, and the software monitoring means are implemented. The logic circuit may be a hard wired circuit but is more preferably an Application Specific Integrated Circuit (ASIC), a Field Programmable Gate Array (FPGA) or the like. However, the logic circuit is preferably not a user programmable device. The boot checking code memory means comprises a ROM which is included in the logic circuit (supplies the data to the CPU).

When an abnormal condition is indicated, the operation of the platform will be altered to prevent fraudulent operation or use of unauthorized software. This may be achieved by altering the function of otherwise unrelated parts of the logic circuit. It may also involve the logic circuit causing a reset of the processor means or preventing software access to sensitive functions of the platform. Preferably however, program segments relating to non-sensitive functions to continue to run, whereby information may be given to a user about the abnormal condition. When the platform is a gaming console, the sensitive functions comprise game operation, metering of console parameters such as hardware meters, credit input and credit output. Preferably also, when an abnormal condition is indicated, the platform will be prevented from operating until the condition is acknowledged by an operator and corrected.

To facilitate correction of an abnormal condition, data indicative of the abnormal condition is preferably stored in non-volatile memory and for greater security again, non-erasable memory may be used.

Preferably, additional security for the secure boot routine is provided by performing a software security check of an entire boot memory in which the boot routine is held. This is preferably performed using a digital signature checking program, however it is also possible to implement security of the boot routine by using a hash code checking program, or another similar software security technique, to check an entire boot memory in which the boot routine is held and implementing signature checks in the executable code of the secure routine. Other programs may also be checked by signature or hash code before they are run, such that new game programs may be loaded onto the platform and validated without changing the secure program. The signature or hash checking routines are preferably contained in the part of the boot code which is checked by the logic circuit.

In one form of the invention the logic circuit is removably connected to the platform for external verification of the secure program. In this case the logic circuit includes connection means to allow the removable connection to the platform. This enables the software to be checked by a third party such as an agent of a licensing authority. In one embodiment the logic circuit acts as an In-Circuit Emulator (ICE) for the processor means when it is attached to the platform and data stored in the boot program memory means are read via the ICE. In another embodiment the logic circuit incorporates logic which dumps the system memory contents to an external port. This may be achieved by asserting a pin on the logic circuit during power up, which causes the logic circuit to hold the processor means in a reset state, while it reads the memory contents and transmits it via a serial port to a personal computer. The logic circuit may also be designed to respond to requests from a serial port of the platform to dump memory contents to the serial port.

According to a ninth aspect, the present invention consists in a method of verifying a game program in a gaming machine arranged to play a plurality of games where each game is implemented in a separate game program, wherein the gaming machine is provided with an interface for connection of a secure authorization device which is used to authorize a game program to run, the method comprising the steps of the gaming machine sending an authorization request message to the secure authorization device identifying the game requiring authorization, if the secure authorization device contains a game identification for the game requiring authorization it responds with a message authorizing the game, if the secure authorization device does not contain a game identification for the game requiring authorization it does not respond or responds with a negative message, the gaming machine verifies that the message received from the secure authorization device are from a valid device, the gaming machine only permits the game to be played if it receives with a message authorizing the game from the secure authorization device and it verifies that the secure authorization device is valid.

In particular, a smartcard may be used as the secure authorization device, and may use digital signatures to sign a game authorization message. Preferably the gaming machine holds a signature public key for the secure authorization device and can check the signed game authorization message and the validity of the secure authorization device simultaneously. Preferably also each game is authorized for a limited period only, and the secure authorization device will only authorize a game if the period has not expired. It is also desirable that a previously authorized game should cease to operate if the secure authorization device is removed from the gaming machine to prevent one authorization device from being used on a plurality of machines to authorize simultaneously operating games.

BRIEF DESCRIPTION OF THE DRAWINGS

Embodiments of the invention will now be described by way of example with reference to the accompanying drawings in which.

DETAILED DESCRIPTION OF THE PREFERRED EMBODIMENTS

One method of providing boot program security is to perform a digital signature check of the entire boot EPROM. The disadvantage of this approach is complexity of hardware, so, in preferred embodiments of the invention, it is proposed to only use hash & put signature checks in the software. Using this approach, the hardware design is greatly simplified.

Legal Authorization

Cryptographic digital signatures are a technical solution to the problem of unauthorized code modification. If this method is compromised it becomes possible for unauthorized software to be used in the machine.

The cryptographic methods may also be supplemented by a further method uses a message embed into the authorized software and which makes a legal statement about that software and it ownership or authorization. Such a statement might include a text message such as "This Software Is Authorized By Aristocrat Leisure Industries"

or

"© Aristocrat Leisure Industries"

The authentication hardware or software requires that the message be embedded in the program/data it is authenticating. If the message is not present in the appropriate place the authentication test fails and the data/program is not used. Unlike digital signatures this method is technically easy to cheat, by embedding the message, but provides legal recourse to the manufacturer if it is detected. Digital signatures are technically difficult by potentially legally weak. The two methods may be combined to provide both legal and technical security.

Figure 1:
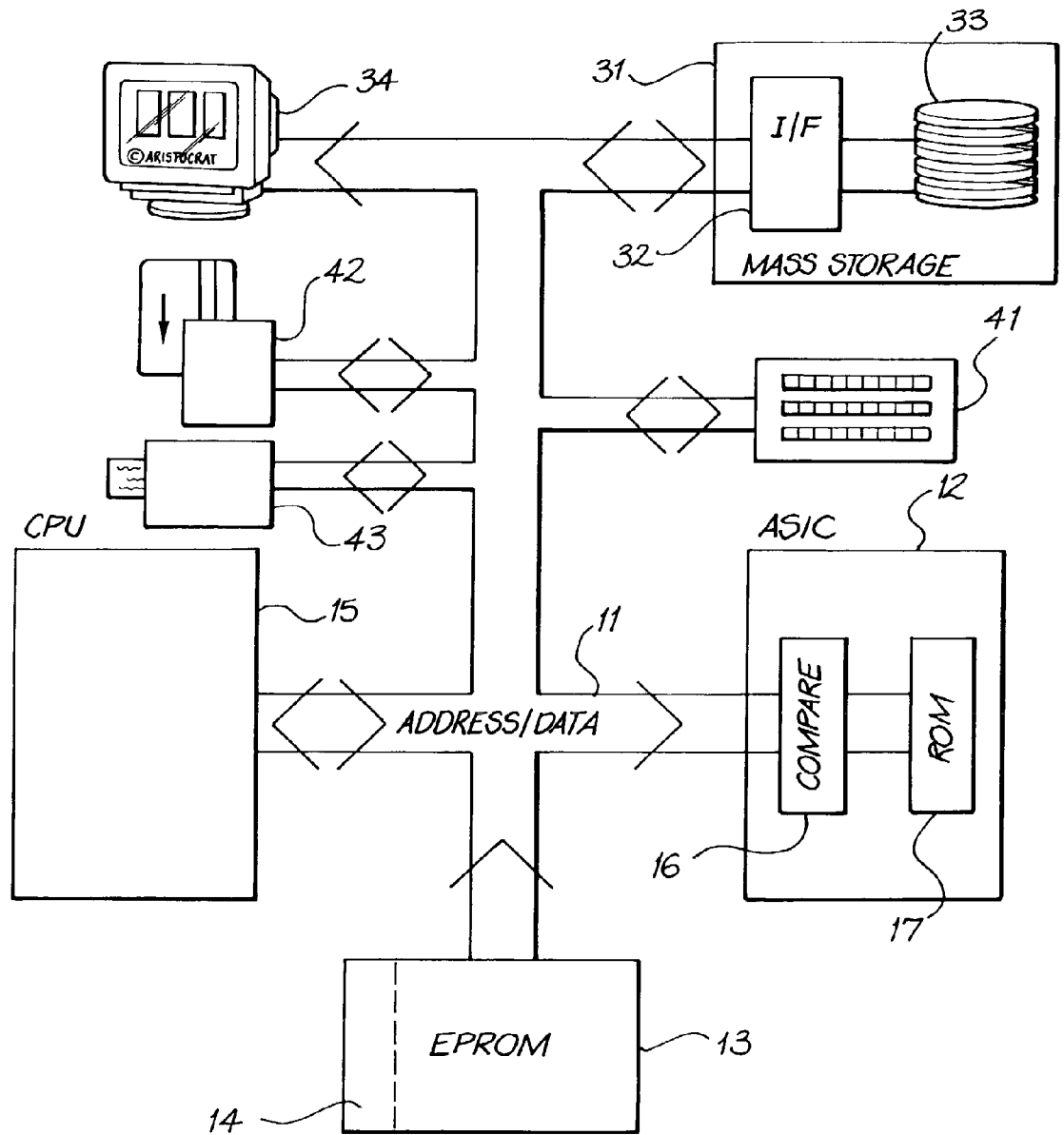
FIG. 1 illustrates a hardware configuration for monitoring data and address buses to check a boot program.

Referring to FIG. 1, after the secure boot routines held in the EPROM 13 have been verified as discussed below, these routines can be used to load programs from a mass storage system 31 such as a hard disk drive 33 and controller/interface 32. Other mass storage systems can also be used such as a CD or DVD ROM drive, a floppy disk drive or ZIP™ drive. The program will be loaded from the mass storage device into RAM by a loader program which is preferably held in EPROM 13, but could also be held a ROM associated with a logic circuit such as the ROM 17 of the Application Specific Integrated Circuit (ASIC) 12 illustrated in FIG. 1. In alternative embodiments, the ASIC 12 may be replaced by a Field Programmable Gate Array (FPGA). As the program is read from the mass storage device 31, the loaded code is scanned for a predetermined text string embedded in the code such as "© Aristocrat Leisure Industries".

The scanning may either be performed in software by a routine in the loader program, or alternatively the ASIC 12 my be programmed to scan the data flowing over the buses 11 and locate the text string. In another embodiment, a hard wired scanning circuit can be connected to the busses 11 to scan for the string. This method of verification may be used in stead of a hashed code or encrypted signature but in the preferred embodiment is used as well as an encrypted signature or hashed code verification method.

Once the loaded program has been verified, the embedded text string will be displayed on a display device 34 such as the video display screen of a gaming machine on which the program is running, such that visual confirmation of the validation is provided. This display function is performed by the loaded program thereby also enabling detection of fraudulent use of software on other manufacturers' hardware. The loaded program also performs internal consistency checks to prevent alteration or deletion of the text string.

Boot Security

These methods improve on the existing art, by allowing the verification of programs and data in boot memory and which is not possible to tamper with by simply changing the program memory.

An advantage of these security systems is that non-volatile re-writable memory can be used to hold the boot program. Even if tampered code were somehow loaded into memory the security mechanisms would prevent it being executed.

An advantage of Application Specific Integrated Circuit (ASIC) monitored memory and hash checked memory security mechanisms is that relatively simple logic is required in the ASIC and the rest of the security mechanism is in software. If the entire mechanism were placed in the ASIC it would be far more complex, costly, less flexible and take longer to design.

Boot memory contains the software that is first executed by the CPU when it exits the reset state.

Monitored memory (or hash checked memory) may also be used to store those parts of the software that access critical security functions. For example the ASIC may contain logic which can enable or disable access to cash payment mechanisms or auditing information. By putting the enabling switch in monitored memory it becomes possible to check the security and authentication of the machine software before enabling or disabling these features.

ASIC Monitored Memory

The boot program is checked by monitoring the CPU address and data buses 11, as shown in FIG. 1. The ASIC 12 which monitors the buses 11 contains a copy (in internal ROM) of the data in a portion 14 of the boot EPROM 13. When each word of data is fetched from EPROM 13 by the CPU 15 a compare function 16 of the ASIC 12 first checks the address to see if it is within that area duplicated in the internal ROM 17, and if it is it then checks the data word that the CPU 15 is reading from the EPROM 13 against the appropriate word in the internal ROM 17. If the data is the same then the CPU 15 is using the correct data from EPROM 13, but if it is different then there is either an accidental error or deliberate tampering. In this event the ASIC 12 takes appropriate action which may include resetting the board and/or stopping other operations of the ASIC 12 internally.

In the preferred implementation the CPU address and data bus 11 are multiplexed together to reduce the number of pins used. Non-multiplexed buses may also be used.

The ASIC 12 may also contain logic to ensure that all memory locations in the monitored memory are checked. If all locations within the monitored area are not checked when an inappropriate access is made outside the monitored area the check fails and the board locks up. An inappropriate access is an instruction fetch or write cycle. Read cycles are allowed, to enable the software in the monitored region to check other parts of memory. Two implementations of this are:

The address bus 11 is monitored and a register is used to store a scanned address value location. Whenever the address from the CPU matches the value in this register the register is incremented. The memory check is complete when the address register reaches the end of the monitored memory.

A signature of address accesses may be implemented. Each address is combined in some form with the previous addresses to generate a fixed pattern. If the sequence of addresses is not the same as the original stored pattern then the check fails. For example each address may be combined using a CRC algorithm with the previous address's although preferably a more secure algorithm would be used.

Other implementations of monitored memory are possible:

Instead of checking the program as it is executed the ASIC disables the EPROM and substitutes data to the CPU from its internal ROM. The ASIC thus acts as a memory device.

The ASIC reads the contents of the monitored EPROM area before the CPU exits the reset state and generates a cryptographic hash of the data. Only if this hash matches a predefined value is the test passed.

Instead of checking the data as it is read from EPROM the ASIC reads the EPROM contents and verifies it before allowing the CPU out of the reset state.

In a variation of the above two implementations, the ASIC allows the CPU to fetch the first word of a program after exiting reset, but inserts into this read cycle the verification reads from EPROM. It is more difficult to tamper with this method as the cycles are not separated clearly.

To provide further protection the monitored boot area may be read and monitored at a later time after the test has passed and game software is running. This provides protection against some forms of tampering where tampered memory is substituted for the original memory after the test passes.

This scheme is most effective with as much functionality of the board as possible implemented in the ASIC. One method of tampering is to replace the entire ASIC, but if significant other functionality is included it becomes a serious technical problem to redesign the ASIC. Additionally the more critical the ASIC is to the functioning of the board then the more difficult it is to get the board working again if the monitoring circuit disables the operation of the ASIC internally.

If the monitored memory test fails, the board and ASIC are typically reset. Alternately program execution is allowed to continue but certain features of the ASIC are disabled preventing the board be used in its full capacity. This allows the software to display appropriate errors messages (especially in the case of accidental memory errors), but effectively stops tampering having any real consequence. In the case of gaming machines, certain critical functions will also be inhibited such as software access to hardware meters 41, and inhibiting input and output of credit or the like, such as by way of the credit card reader 42 or ticket reader/writer 43.

Hashed Checked Memory

The internal ROM of the ASIC is expected to be small compared to the size of the boot EPROM to reduce cost, although it could be the same size. Alternately, and as described above, the cryptographic hash check may be embedded in the ASIC.

The size of the EPROM to be securely checked can be increased to the total size of the memory in the system without increasing the size of the ASIC internal ROM by embedding a checking program in the area of EPROM that is checked by the ASIC. The checking program generates a cryptographic hash over the entire memory area to be checked (which may include the area monitored by the ASIC) and compares it to a pre-computed value. If it matches then the entire region is assumed to be unmodified. The method relies on it being difficult to tamper with the data which is included in the hashed area while retaining the same hash value and that the ASIC monitors the program which generates and checks the hash.

The advantage of this method is that the hash checking program is relatively small, and can be expected to be smaller than a comparable signature checking program. Therefore the size of the ROM in the ASIC can be reduced in size with this method.

A non-cryptographic checking algorithm may be used instead of the hash function, but algorithms such as checksum or CRC are relatively easy to tamper with and are not preferred.

The data to be checked, either directly by the ASIC or included in the hash-checked region, may include program or data. The data may include text messages such as "© Aristocrat Leisure Industries" or "This software is authorized by Aristocrat Leisure Industries".

Signature Checked Memory

Once the initial part of the boot memory has been authorized it can then securely check the rest of the memory in the system.

The monitored memory area may use a hash mechanism to check more memory as described in the previous section or it may implement a digital signature check. The advantage with a digital signature check is in minimizing the amount of boot code that can never be changed without changing the ASIC. The advantage of a hash check is that a hash is simpler and there requires less program space for monitored memory than digital signature software.

Digital signatures are also used to authorize all other modules of software and data in the system, including System software and games. Each authorized EPROM or file has an associated digital signature which is checked. If invalid signatures are found the data will not be used and appropriate action will be taken, such as the machine locking up and displaying a message.

Figure 2:
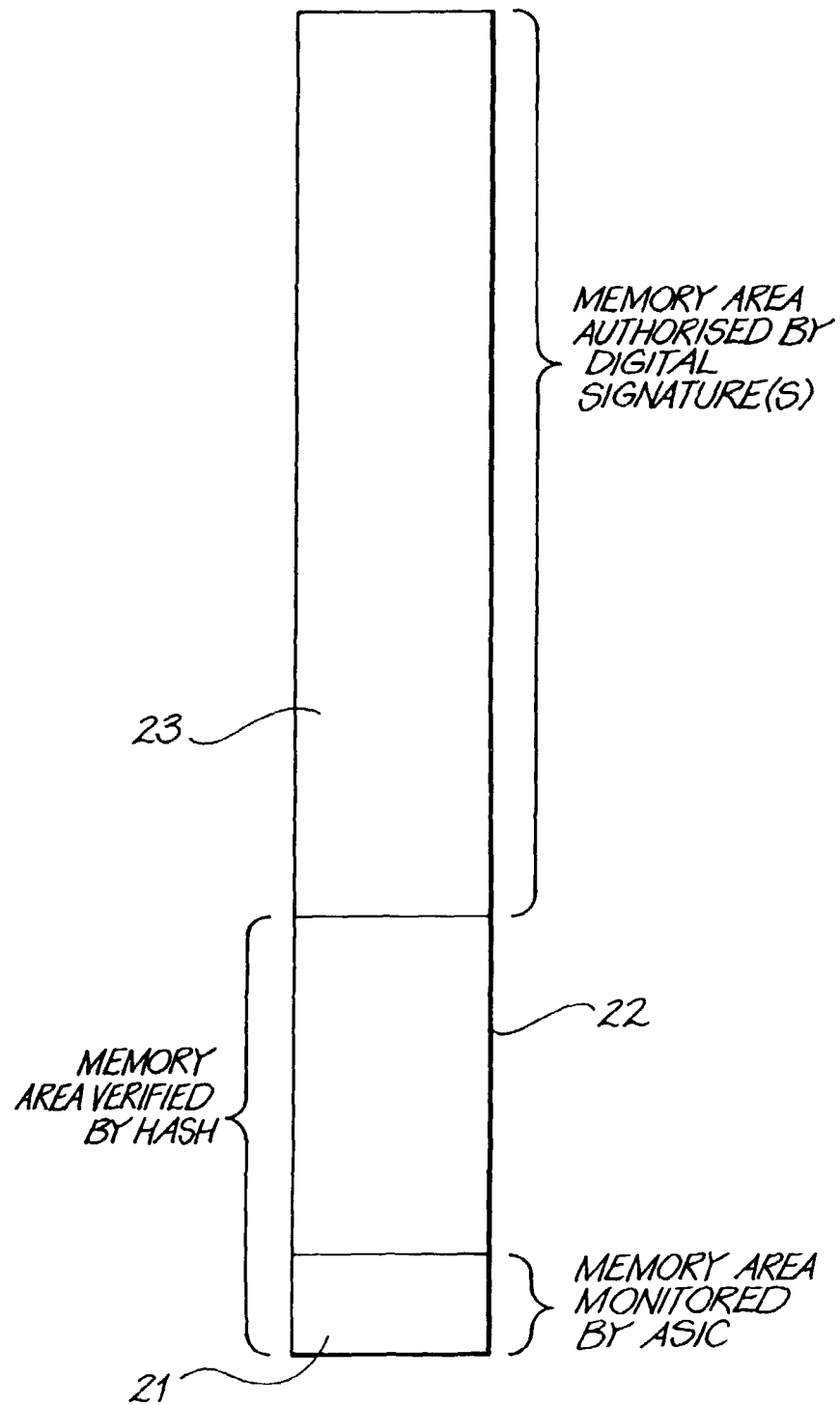
FIG. 2 illustrates a memory map of a CPU memory showing the security measures applied to different memory segments.

FIG. 2 shows a schematic of a memory map in which a first section of the memory space 21 is checked by the ASIC 12, a second part of the memory space 22 is checked by a hashed code and a third part of the memory space 23 is checked by digital signature. The memory space checked by the checking software may include or exclude the area in which the checking software resides. In the example illustrated in FIG. 2 the signature checked memory space 23 does not encompass the memory space 21 containing the checking software (ie. the space monitored by the ASIC) but the hash checked memory space 22 does encompass the memory space 21.

Continuous Authorization

Continuous monitoring of the authenticity of software provides extra security. The memory contents are periodically rechecked to ensure that changes have not occurred.

Continuous monitoring requires a method of getting the CPU to start executing software within the monitored (or alternately hash checked, although this is not as secure) memory area. Once the CPU starts executing software within this secure area it can again perform authorization checks of the system as required. A watchdog type monitor is implemented in the ASIC which must be accessed periodically from software executing within the secured memory area otherwise the ASIC will force the system to shutdown. This transfer to secure area may be simply by software jumping to an address periodically or caused by an interrupt from the ASIC.

The ASIC must be able to detect that software is executing from the monitored area. The method used depends on the processor implementation.

For processors which support identification of external bus cycles an instruction fetch from a predefined address is used.

For processors without identification of bus cycles and also without internal cache memory a sequence of memory accesses is detected that may only be generated by software executing within the monitored area.

For CPU without bus cycle identification and also with cache it may not be possible to guarantee detection of monitored area software execution. Tampering could take place by execution of software within the cache so that external cycles appeared to be the correct software accesses.

An alternate method of guaranteeing execution within monitored memory is to periodically reset the CPU. In this implementation the CPU is able to be reset separately from the rest of the system. Prior to being reset, the CPU saves it's operational state in memory for restoration after the authentication checks have been completed. After the ASIC has reset the CPU then the CPU must be executing from monitored memory. A flag in the ASIC indicates the cause of the reset so the CPU knows whether to execute cold start reset code or continuous monitoring code. While the CPU is in the reset state the ASIC checks the state of the relevant pins to ensure that the CPU actually has been reset. In the preferred implementation the ASIC contains a timer which is initialized after each reset and which locks up the board when it reaches a predefined count. The timer would require that the CPU be reset every five minutes for example. Periodically and at least less than every 5 minutes the system software saves the system state and instructs the ASIC to reset the CPU and also timer. The system software can choose a point in its operation where a slight delay while the CPU resets is not noticeable. Alternately the ASIC generates an interrupt periodically which the system software responds to by saving the CPU state and then the CPU resets.

These authentication checks are as described in the rest of the document. The authentication check can be divided into a number of these execution periods to divide the CPU loading over time. In this case the check software may need to store information between the periods (such as the last memory location checked). Although this data may be stored in RAM, it is accessible by any software running on the machine and could be tampered with. Preferably the ASIC implements some RAM only accessible from by software running within the monitored memory area.

One possible method of tampering is to find start execution of code within the monitored area, which was not intended as a start address for the routine and which has side effects unintended by the system programmers. This side effect would access the flag in the ASIC without running the security check. On method of preventing this is to implement an address signature check as described for "ASIC Monitored Memory". A significant section of code must be executed correctly for the signature to be correct and it must be from the correct address. Many other methods are possible.

One method of tampering with the system is to allow the correct boot code to be executed after reset and during authentication, then at an appropriate point map into the program memory a new section of code (eg. in hardware swap EPROMS with a multiplexer circuit). This memory automatically mapped in an out of memory space depending on where program execution is being performed. The authentication check reads the original data and passes, but when control is passed elsewhere a different program is executed. To prevent this attack, at a random time the ASIC reads from the CPU data bus the instruction fetched from memory, and stores it in a register together with the address from which it was read. When the periodic authentication check is performed it reads these registers and compares them with the data it reads from the same location. If the data is different then tampering has taken place. This test will eventually, at a random time, detect tampering. To speed up this test more than one data location may be sampled. Because it may take some time before tampering is detected it is preferable that when tampering is detected this information is stored so that the machine cannot be used until this condition is acknowledged by the operator and fixed. It should be stored in non-volatile memory, and preferably non-erasable memory.

True random number generation is not usually feasible in an ASIC and instead pseudo-random numbers are typically used instead. The pseudo-random number may be randomized further by combining it with some external information, such as the contents of the data or address bus.

An alternate method is to use DMA or bus mastering by the ASIC to automatically read the contents of memory and verify the data. This method is most suitable for the boot code, as the complexity of the design for more equivalent functionality to that easily achieved in secure software to very high—although it is possible.

External Memory Verification

In the gaming market regulators often require that the contents of programmed memory be externally verifiable. This traditionally has been via reading the programmed chip in a commercial device programmer, however it is preferable if this can be performed without removing the device from the board—especially if it has been assembled in such a was that make this difficult (eg. surface mount assembly).

There are several methods of allowing the memory contents to be read:
- A CPU In-circuit emulator is attached to the board and the device memory contents read via the emulator. An automated verification package may be constructed which automatically drives the emulator to read and compare memory images without providing the full functionality or complexity of an In-Circuit Emulator.
- The ASIC incorporates logic which dumps the system memory contents to an external port. In one implementation, when requested by asserting a pin on the ASIC during power up, it holds the board in reset, reads the memory contents and transmits it via a serial port to a PC.
- The software responds to requests from the machine serial port to dump memory contents to the serial port. Given the authentication built into the machine the data is trusted to be correct. However it is preferable that the software to perform this function is as secure from any form of tampering as possible, and so is either in monitored memory or hash checked memory. Code which changes often is less secure as there is more chance that the security procedure may be compromised.

Software Development

Software development requires that engineers be able to run any code they wish on the gaming machine. It is not desirable to allow software engineers to sign their code with the real product keys, as security would be quickly compromised.

Several methods of allowing software development are possible:
- Another version of the gaming machine CPU board exists without security. It is only used for internal development and never into the field.
- Developers sign their software with a different key to that used for finished software. The authorization software in the machine detects this developer key and either displays a message to the player, gaming machine operator, service technician, etc, or disables some key features of the product.
- Where a special non-secure version of the CPU board exists without security care must be taken that it is not feasible to convert the secure version into the non-secure version. Methods to accomplish this are:
  Two versions of the ASIC are produced, with and without security. Only a limited number a made without security and distribution of these is carefully controlled. If they are manufactured in a different physical IC package they may be visibly different or require different PCB designs.
  The ASIC has a pin which disables the security features. For production parts the ASIC is shipped with this pin internally unconnected in the ASIC package, so that security is enabled. As a security screening mechanism it is possible to detect if security is enabled, either via software or ATE board test.
  The security of the ASIC is enabled by an external feature of the board that is difficult to tamper with. For example if the ASIC is in a BGA package, several pins must be connected to disable security. When the PCB is manufactured without these tracks it would be very difficult to modify the board to reconnect the pins.
  An FPGA without the security feature is substituted for the ASIC. The FPGA requires an external configuration EPROM. On boards with the ASIC the connections to the configuration EPROM may be removed either by design of the PCB or scratching or drilling some of the connections on the board. It becomes technically difficult to modify a board with ASIC to have a FPGA and also it is very noticeably different.

Methods of Tampering

The security of ASIC monitoring of memory relies on the difficulty of modifying the ASIC. This is exceptionally difficult compared to the 'normal' method of tampering with the EPROM.

Several methods of attack are possible:
- Modifying the ASIC to impair security. The checking logic may be changed or removed. A new ASIC may be designed without the checking circuit or with a checking circuit that does not operate in the correct manner. The data in the ASIC ROM used for monitoring comparison may be modified.
- The board may be modified to cause the ASIC to monitor the correct data while the CPU is executing different data. In the worst case this need only happen for as little as one read cycle to cause the monitoring to fail.

Multigame

The Multigame authorization system allows games to be used only on the system for which they are authorized. The System program confirms the authorization of the game before it is allowed to be used.

Preferably game authorization comprises one or more of the following steps:
- The header section of the game memory is checked to confirm that it is an appropriate game (eg. not another system EPROM incorrectly used, has valid version numbers, etc).
- The game header is checked for the legal authorization message.
- The game header checksum or CRC is checked to ensure memory integrity.
- If the games are digitally signed, then the digital signature(s) are validated.
- The authorization of the game to run on this particular gaming machine is checked.

If the authorization fails the gaming machine may either continue without allowing that game to be used, stop and ask the operator to remove the game from the machine, or run that game only in demonstration mode.

Preferably each gaming machine contains a unique identification number which the CPU can read and use as part of the authorization code.

This can be implemented using a Dallas Semiconductor serial identification chip (eg. DS2401).

Games may be signed with DEMO key which runs in the game in a limited mode and displays an appropriate message on the screen. The limited mode may prevent the machine accepting or paying out money or updating critical auditing information.

EEPROM Authorization

An authorization message is created using by applying a digital signature to a message composed of the unique Game Identifier, a unique Gaming Machine identifier and any usage restrictions that may be required (eg. date restriction on game operation). The signature is generated in an secure environment and sent to the gaming machine where it is stored in non-volatile memory for later use.

The secure environment may be:

Within a smartcard. A service technician or operator may authorize the game to run on the machine by connecting the smartcard to the machine where the game is installed. To limit accidental or deliberate fraud the smartcard preferably contains a limit on the number of games that can be authorized. The smartcard may be inserted into a special purpose interface on the gaming machine, a general purpose interface such as is used for player marketing cards or via a PC and communication interface (eg. RS232 or Ethernet) with a smartcard reader.

The gaming machine supplier may generate the authorization key and supply it to the service technician/operator for entry into the gaming machine.

The authorizations may be encoded into removable EEPROM chip which is supplied to the operator with the new games.

Smartcard Authorization

The gaming machine has a smartcard interface which is used to authorize a game to run. The games are authorized for a limited period and the smartcard must always be present in the machine. When the smartcard is removed the machine detects this within a reasonable period of time and stops the games running. This prevents a single smartcard be used to authorize games on multiple machines.

The advantage of the smartcard is this application is that it will not be possible to make a copy and that it can contain restrictions on game usage.

To authorize a game, the gaming machine sends an authorization request message to the smartcard containing the game ID. The smartcard responds with a message either allowing the game or not and the smartcard is also verified as being allowed to authorize games. Preferably the smartcard uses digital signatures to sign a game authorization message. The gaming machine contains the signature public key and can therefore both check the message and the smartcard.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A boot program security system associated with a platform for software execution, wherein the security system verifies an executable boot program to be executed on the platform and which contains basic components of a platform operating system which perform a security validation of other software components and authorizes their execution on the platform, the platform including cash payment mechanism, processor means for executing the executable boot program, boot program memory means in which the executable boot program is stored, and address bus means and data bus means which provide communication between the processor means and the boot program memory means, the security system including boot checking memory means, comparison means, and software monitoring means to monitor addresses expressed on the address bus means by the processor means, the software monitoring means being responsive to addresses on the address bus corresponding to locations in which a secure portion of the executable boot program is stored, to read data expressed on the data bus means by the boot program memory means and representing words of the executable boot program being verified, providing the data read from the data bus to the comparison means for comparison with corresponding data in the boot checking memory means and if the data does not match, producing a signal to indicate an abnormal condition, the security system further including logic configured to disable access to said cash payment mechanism of the platform if an abnormal condition is indicated.

2. The system of claim 1 wherein the boot checking code memory means, the comparison means, and the software monitoring means are implemented in a logic circuit.

3. The system of claim 2 wherein the logic circuit is an Application Specific Integrated Circuit (ASIC).

4. The system of claim 2 wherein the special purpose integrated circuit, is a Field Programmable Gate Array (FPGA).

5. The system of claim 2, wherein the boot checking code memory means comprises a ROM which is included in the logic circuit.

6. The system as claimed in claim 2 wherein, when an abnormal condition is indicated, the function of otherwise unrelated parts of the logic circuit are altered.

7. The system as claimed in claim 2 wherein, when an abnormal condition is indicated, the logic circuit resets the processor means.

8. The system as claimed in claim 2 wherein, when an abnormal condition is indicated, the logic circuit prevents software access to sensitive functions of the platform.

9. The system as claimed in claim 8 wherein, when an abnormal condition is indicated, the logic circuit permits program segments relating to non-sensitive functions to continue to run, whereby information may be given to a user about the abnormal condition.

10. The system as claimed in claim 8 wherein the platform is a gaming console and the sensitive functions comprise game operation, metering of console parameters, credit input and credit output.

11. The system as claimed in claim 1 wherein, the secure portion of the executable boot program checked by the logic circuit contains a checking program which performs a software security check of a first further block of memory and if the security check fails the boot program prevents program code or data in the security checked block of memory from being used by the platform.

12. The system as claimed in claim 11 wherein the software security check is performed using a secure hash checking program.

13. The system as claimed in claim 11 wherein, the block of memory checked by the software security check contains a digital signature checking program which performs a digital signature check of a second further block of memory and if the digital signature check fails the boot program prevents program code or data in the digital signature checked second block of memory from being used by the platform.

14. The system as claimed in claim 11 wherein the software security check is performed using a digital signature checking program.

15. The system as claimed in claim 11, wherein the first further block of memory checked by the checking program includes a part of the boot program memory in which the secure portion of the executable boot program is stored.

16. The system as claimed in claim 11, wherein the first further block of memory checked by the checking program does not include a part of the boot program memory in which the secure portion of the executable boot program is stored.

17. The system as claimed in claim 1 wherein, the logic circuit periodically reads from the data bus means data representing an instruction fetched from the boot program memory means, and stores it in a register together with the address from which it was read and subsequently compares the data in the register with the corresponding data read during the verification process and if the data does not match an abnormal condition is indicated.

18. The system of claim 17 wherein, when an abnormal condition is indicated, the platform is prevented from operating until the condition is acknowledged by an operator and corrected.

19. The system of claim 17 wherein, when an abnormal condition is indicated, data indicative of the abnormal condition is stored in non-volatile memory.

20. The system of claim 19 wherein, when an abnormal condition is indicated, data indicative of the abnormal condition is stored in non-erasable memory.

21. The system as claimed in claim 1 wherein, the logic circuit includes connection means to allow removable connection to the platform for external verification of the secure program.

22. The system as claimed in claim 21 wherein the logic circuit acts as an In-Circuit Emulator (ICE) for the processor means when it is attached to the platform and data stored in the boot program memory means are read via the ICE.

23. The system as claimed in claim 21 wherein the logic circuit incorporates logic which dumps the system memory contents to an external port.

24. The system as claimed in claim 21 wherein, the logic circuit, when requested by asserting a pin on the logic circuit during power up, holds the processor means in a reset state, reads the memory contents and transmits it via a serial port to a personal computer.

25. The system as claimed in claim 21 wherein, the logic circuit responds to requests from a serial port of the platform to dump memory contents to the serial port.

26. A boot program security system associated with a platform for software execution, wherein the security system verifies an executable boot program to be executed on the platform and which contains basic components of a platform operating system which perform a security validation of other software components and authorizes their execution on the platform, the platform including cash payment mechanism, processor means for executing the executable boot program, boot program memory means in which the executable boot program is stored, and address bus means and data bus means which provide communication between the processor means and the boot program memory means, the security system including boot checking memory means, comparison means, and software reading means to read data from the boot program memory means corresponding to a secure portion of the executable boot program and providing the data read from the boot program memory means to the comparison means for comparison with corresponding data in the boot checking memory means and, if the data does not match, producing a signal to indicate an abnormal condition, the security system further including logic configured to disable access to said cash payment mechanism of the platform if an abnormal condition is indicated.

27. The system of claim 26 wherein the logic circuit compares the memory while the processor means is in a reset state.

28. The system of claim 26 wherein the logic circuit compares the memory while the processor means is in a halt state.

29. The system of claim 26, wherein the boot checking code memory means, the comparison means, and the software reading means are implemented in a logic circuit.

30. The system of claim 29 wherein the logic circuit is an Application Specific Integrated Circuit (ASIC).

31. The system of claim 29 wherein the logic circuit, is a Field Programmable Gate Array (FPGA).

32. The system of claim 30, wherein the boot checking code memory means comprises a ROM which is included in the logic circuit.

33. The system as claimed in claim 29 wherein, when an abnormal condition is indicated, the function of otherwise unrelated parts of the logic circuit are altered.

34. The system as claimed in claim 29 wherein, when an abnormal condition is indicated, the logic circuit resets the processor means.

35. The system as claimed in claim 29 wherein, when an abnormal condition is indicated, the logic circuit prevents software access to sensitive functions of the platform.

36. The system as claimed in claim 35 wherein, when an abnormal condition is indicated, the logic circuit permits program segments relating to non-sensitive functions to continue to run, whereby information may be given to a user about the abnormal condition.

37. The system as claimed in claim 36 wherein the platform is a gaming console and the sensitive functions comprise game operation, metering of console parameters, credit input and credit output.

38. The system as claimed in claim 26 wherein, the secure portion of the executable boot program checked by the logic circuit contains a checking program which performs a software security check of a first further block of memory and if the security check fails the boot program prevents program code or data in the security checked block of memory from being used by the platform.

39. The system as claimed in claim 38 wherein the software security check is performed using a secure hash checking program.

40. The system as claimed in claim 38 wherein, the block of memory checked by the software security check contains a digital signature checking program which performs a digital signature check of a second further block of memory and if the digital signature check fails the boot program prevents program code or data in the digital signature checked second block of memory from being used by the platform.

41. The system as claimed in claim 38 wherein the software security check is performed using a digital signature checking program.

42. The system as claimed in claim 38, wherein the first further block of memory checked by the checking program includes a part of the boot program memory in which the secure portion of the executable boot program is stored.

43. The system as claimed in claim 38, wherein the first further block of memory checked by the checking program does not include a part of the boot program memory in which the secure portion of the executable boot program is stored.

44. The system as claimed in claim 26 wherein, the logic circuit periodically reads from the data bus means data representing an instruction fetched from the boot program memory means, and stores it in a register together with the address from which it was read and subsequently compares the data in the register with the corresponding data read during the verification process and if the data does not match an abnormal condition is indicated.

45. The system of claim 44 wherein, when an abnormal condition is indicated, the platform is prevented from operating until the condition is acknowledged by an operator and corrected.

46. The system of claim 44 wherein, when an abnormal condition is indicated, data indicative of the abnormal condition is stored in non-volatile memory.

47. The system of claim 46 wherein, when an abnormal condition is indicated, data indicative of the abnormal condition is stored in non-erasable memory.

48. The system as claimed in claim 26 wherein, the logic circuit includes connection means to allow removable connection to the platform for external verification of the secure program.

49. The system as claimed in claim 48 wherein the logic circuit acts as an In-Circuit Emulator (ICE) for the processor means when it is attached to the platform and data stored in the boot program memory means are read via the ICE.

50. The system as claimed in claim 48 wherein the logic circuit incorporates logic which dumps the system memory contents to an external port.

51. The system as claimed in claim 49 wherein, the logic circuit, when requested by asserting a pin on the logic circuit during power up, holds the processor means in a reset state, reads the memory contents and transmits it via a serial port to a personal computer.

52. The system as claimed in claim 49 wherein, the logic circuit responds to requests from a serial port of the platform to dump memory contents to the serial port.

53. A method of verifying an executable boot program associated with a platform for software execution, the boot program being for execution on the platform and containing basic components of a platform operating system which perform a security validation of other software components and authorizes their execution on the platform, the platform including cash payment mechanism, processor means for executing the executable boot program, boot program memory means in which the executable boot program is stored, and address bus means and data bus means which provide communication between the processor means and the boot program memory means, a verification system including boot checking memory means, comparison means, and software monitoring means and the method including the steps of, the software monitoring means monitoring addresses expressed on the address bus means by the processor means, the software monitoring means being responsive to addresses on the address bus corresponding to locations in which a secure portion of the executable boot program is stored, to read data expressed on the data bus means by the boot program memory means and representing words of the executable boot program being verified, and providing the data read from the data bus to the comparison means, the comparison means comparing the data read from the data bus with corresponding data in the boot checking memory means, and if the data does not match, the comparison means producing a signal to indicate an abnormal condition, and disabling access to said cash payment mechanism of the platform if an abnormal condition is indicated.

54. The method of claim 53 wherein the boot checking code memory means, the comparison means, and the software monitoring means are implemented in a logic circuit.

55. The method of claim 54 wherein the logic circuit is an Application Specific Integrated Circuit (ASIC).

56. The method of claim 54 wherein the special purpose integrated circuit, is a Field Programmable Gate Array (FPGA).

57. The method of claim 54, wherein the boot checking code memory means comprises a ROM which is included in the logic circuit (supplies the data to the CPU).

58. The method as claimed in claim 54 wherein, when an abnormal condition is indicated, the function of otherwise unrelated parts of the logic circuit are altered.

59. The method as claimed in claim 54 wherein, when an abnormal condition is indicated, the logic circuit resets the processor means.

60. The method as claimed in claim 54 wherein, when an abnormal condition is indicated, the logic circuit prevents software access to sensitive functions of the platform.

61. The method as claimed in claim 60 wherein, when an abnormal condition is indicated, the logic circuit permits program segments relating to non-sensitive functions to continue to run, whereby information may be given to a user about the abnormal condition.

62. The method as claimed in claim 60 wherein the platform is a gaming console and the sensitive functions comprise game operation, metering of console parameters, credit input and credit output.

63. The method as claimed in any one of claim 53 wherein, the secure portion of the executable boot program checked by the logic circuit contains a checking program which performs a software security check of a first further block of memory and if the security check fails the boot program prevents program code or data in the security checked block of memory from being used by the platform.

64. The method as claimed in claim 63 wherein the software security check is performed using a secure hash checking program.

65. The method as claimed in claim 63 wherein, the block of memory checked by the software security check contains a digital signature checking program which performs a digital signature check of a second further block of memory and if the digital signature check fails the boot program prevents program code or data in the digital signature checked second block of memory from being used by the platform.

66. The method as claimed in claim 63 wherein the software security check is performed using a digital signature checking program.

67. The method as claimed in claim 63, wherein the first further block of memory checked by the checking program includes a part of the boot program memory in which the secure portion of the executable boot program is stored.

68. The method as claimed in claim 63, wherein the first further block of memory checked by the checking program does not include a part of the boot program memory in which the secure portion of the executable boot program is stored.

69. The method as claimed in claim 53 wherein, the logic circuit periodically reads from the data bus means data representing an instruction fetched from the boot program memory means, and stores it in a register together with the address from which it was read and subsequently compares the data in the register with the corresponding data read during the verification process and if the data does not match an abnormal condition is indicated.

70. The method of claim 69 wherein, when an abnormal condition is indicated, the platform is prevented from operating until the condition is acknowledged by an operator and corrected.

71. The method of claim 69 wherein, when an abnormal condition is indicated, data indicative of the abnormal condition is stored in non-volatile memory.

72. The method of claim 71 wherein, when an abnormal condition is indicated, data indicative of the abnormal condition is stored in non-erasable memory.

73. The method as claimed in claim 53 wherein, the logic circuit includes connection means to allow removable connection to the platform for external verification of the secure program.

74. The method as claimed in claim 73 wherein the logic circuit acts as an In-Circuit Emulator (ICE) for the processor means when it is attached to the platform and data stored in the boot program memory means are read via the ICE.

75. The method as claimed in claim 73 wherein the logic circuit incorporates logic which dumps the system memory contents to an external port.

76. The method as claimed in claim 73 wherein, the logic circuit, when requested by asserting a pin on the logic circuit during power up, holds the processor means in a reset state, reads the memory contents and transmits it via a serial port to a personal computer.

77. The method as claimed in claim 73 wherein, the logic circuit responds to requests from a serial port of the platform to dump memory contents to the serial port.

78. A method of verifying an executable boot program associated with a platform for software execution, the boot program being for execution on the platform and containing basic components of a platform operating system which perform a security validation of other software components and authorizes their execution on the platform, the platform including cash payment mechanism, processor means for executing the executable boot program, boot program memory means in which the executable boot program is stored, and address bus means and data bus means which provide communication between the processor means and the boot program memory means, and a security system including boot checking memory means, comparison means, and software reading means, the method comprising the steps of, reading data from the boot program memory means corresponding to a secure portion of the executable boot program, providing the data read from the boot program memory means to the comparison means, comparing the data read from the boot program memory means with corresponding data in the boot checking memory means, and if the data does not match, producing a signal to indicate an abnormal condition, and disabling access to said cash payment mechanism of the platform if an abnormal condition is indicated.

79. The method of claim 78 wherein the logic circuit compares the memory while the processor means is in a reset state.

80. The method of claim 78 wherein the logic circuit compares the memory while the processor means is in a halt state.

81. The method of claim 78, wherein the boot checking code memory means, the comparison means, and the software reading means are implemented in a logic circuit.

82. The method of claim 81 wherein the logic circuit is an Application Specific Integrated Circuit (ASIC).

83. The method of claim 81 wherein the special purpose integrated circuit, is a Field Programmable Gate Array (FPGA).

84. The method of claim 81, wherein the boot checking code memory means comprises a ROM which is included in the logic circuit.

85. The method as claimed in claim 81 wherein, when an abnormal condition is indicated, the function of otherwise unrelated parts of the logic circuit are altered.

86. The method as claimed in claim 81 wherein, when an abnormal condition is indicated, the logic circuit resets the processor means.

87. The method as claimed in claim 81 wherein, when an abnormal condition is indicated, the logic circuit prevents software access to sensitive functions of the platform.

88. The method as claimed in claim 87 wherein, when an abnormal condition is indicated, the logic circuit permits program segments relating to non-sensitive functions to continue to run, whereby information may be given to a user about the abnormal condition.

89. The method as claimed in claim 87 wherein the platform is a gaming console and the sensitive functions comprise game operation, metering of console parameters, credit input and credit output.

90. The method as claimed in claim 78 wherein, the secure portion of the executable boot program checked by the logic circuit contains a checking program which performs a software security check of a first further block of memory and if the security check fails the boot program prevents program code or data in the security checked block of memory from being used by the platform.

91. The method as claimed in claim 90 wherein the software security check is performed using a secure hash checking program.

92. The method as claimed in claim 90 wherein, the block of memory checked by the software security check contains a digital signature checking program which performs a digital signature check of a second further block of memory and if the digital signature check fails the boot program prevents program code or data in the digital signature checked second block of memory from being used by the platform.

93. The method as claimed in claim 90 wherein the software security check is performed using a digital signature checking program.

94. The system as claimed in claim 90, wherein the first further block of memory checked by the checking program includes a part of the boot program memory in which the secure portion of the executable boot program is stored.

95. The method as claimed in claim 90, wherein the first further block of memory checked by the checking program does not include a part of the boot program memory in which the secure portion of the executable boot program is stored.

96. The method as claimed in claim 78 wherein, the logic circuit periodically reads from the data bus means data representing an instruction fetched from the boot program memory means, and stores it in a register together with the address from which it was read and subsequently compares the data in the register with the corresponding data read during the verification process and if the data does not match an abnormal condition is indicated.

97. The method of claim 96 wherein, when an abnormal condition is indicated, the platform is prevented from operating until the condition is acknowledged by an operator and corrected.

98. The method of claim 96 wherein, when an abnormal condition is indicated, data indicative of the abnormal condition is stored in non-volatile memory.

99. The method of claim 98 wherein, when an abnormal condition is indicated, data indicative of the abnormal condition is stored in non-erasable memory.

100. The method as claimed in claim 78 wherein, the logic circuit includes connection means to allow removable connection to the platform for external verification of the secure program.

101. The method as claimed in claim 100 wherein the logic circuit acts as an In-Circuit Emulator (ICE) for the processor means when it is attached to the platform and data stored in the boot program memory means are read via the ICE.

102. The method as claimed in claim 100 wherein the logic circuit incorporates logic which dumps the system memory contents to an external port.

103. The method as claimed in claim 100 wherein, the logic circuit, when requested by asserting a pin on the logic circuit during power up, holds the processor means in a reset state, reads the memory contents and transmits it via a serial port to a personal computer.

104. The method as claimed in claim 100 wherein, the logic circuit responds to requests from a serial port of the platform to dump memory contents to the serial port.

* * * * *